US011215830B1

(12) United States Patent
Richards

(10) Patent No.: US 11,215,830 B1
(45) Date of Patent: Jan. 4, 2022

(54) LIGHT DIRECTORS FOR HEAD MOUNTED DISPLAY

(71) Applicant: Facebook Technologies, LLC, Menlo Park, CA (US)

(72) Inventor: Evan M. Richards, Fremont, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/373,171

(22) Filed: Apr. 2, 2019

(51) Int. Cl.
*G02B 27/01* (2006.01)
*G02B 5/02* (2006.01)

(52) U.S. Cl.
CPC ....... *G02B 27/0172* (2013.01); *G02B 5/0278* (2013.01); *G02B 2027/014* (2013.01); *G02B 2027/0118* (2013.01)

(58) Field of Classification Search
CPC .............. G09G 2380/10; G02B 27/01; G02B 2027/01; B60K 2350/2052; B60K 2350/2056; G09B 9/307; G06F 3/011; G06F 3/012; G06F 3/013
See application file for complete search history.

(56) References Cited

U.S. PATENT DOCUMENTS

| 2013/0070480 | A1* | 3/2013 | Griffin | G02B 6/0028 |
| | | | | 362/612 |
| 2017/0139211 | A1* | 5/2017 | Trail | G02B 27/0172 |
| 2017/0240456 | A1* | 8/2017 | Akarapu | C03B 37/02727 |
| 2018/0175264 | A1* | 6/2018 | Lee | F21K 9/27 |
| 2019/0101759 | A1 | 4/2019 | Usukura et al. | |
| 2019/0236887 | A1* | 8/2019 | Rich | G02B 3/0056 |

* cited by examiner

*Primary Examiner* — William Boddie
*Assistant Examiner* — Jeffrey Parker
(74) *Attorney, Agent, or Firm* — Freestone IP Law PLLC; Aaron J. Visbeek; William J. Pigott

(57) ABSTRACT

A head mounted display (HMD) includes an electronic display and a light director assembly. The electronic display includes a region of subpixels that are configured to emit light. The light director assembly is coupled to receive the light and to direct the light to an optical assembly of the HMD. The light director assembly includes a plurality of light directors configured to reduce an angular distribution of the light emitted from corresponding subpixels included in the region of subpixels.

16 Claims, 9 Drawing Sheets

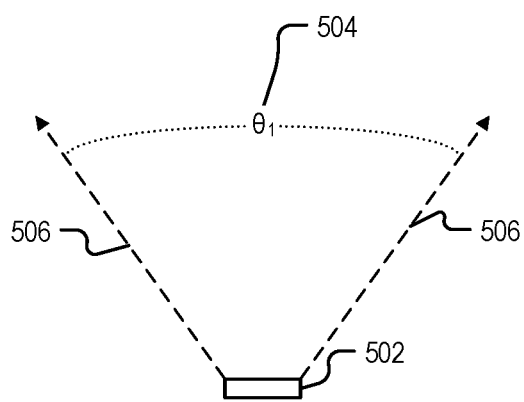
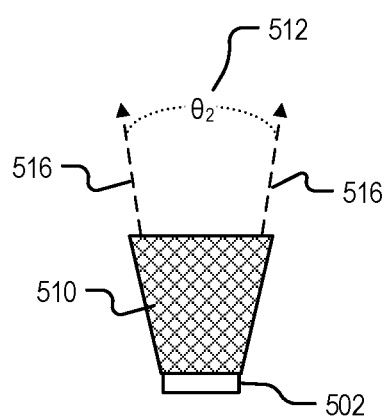
FIG. 5A　　　FIG. 5B
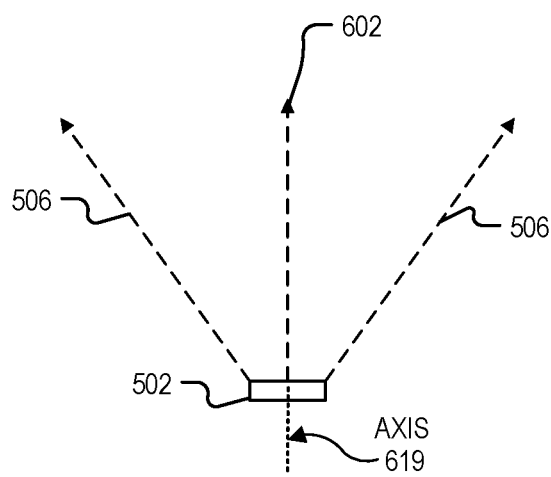
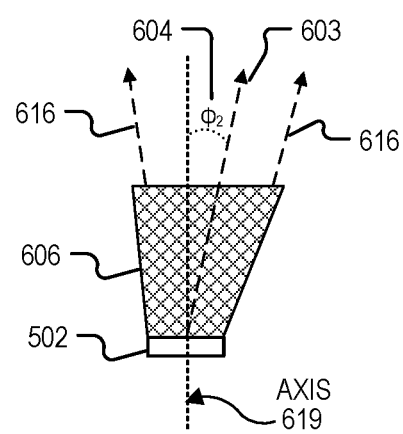
FIG. 6A　　　FIG. 6B
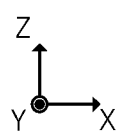

LIGHT DIRECTORS FOR HEAD MOUNTED DISPLAY

FIELD OF DISCLOSURE

Aspects of the present disclosure relate generally to head mounted displays, and in particular but not exclusively, relate to head mounted displays with a light director.

BACKGROUND

A head mounted display (HMD) is a display device, typically worn on the head of a user. HMDs may be used in a variety of applications, such as gaming, aviation, engineering, medicine, entertainment and so on. The HMD typically includes an electronic display (e.g., a liquid crystal display, an organic light emitting diode display, etc.) for generating content. With HMDs, the user's eye occupies a region of space, typically referred to as an eye box. Thus, the HMD may further include display optics for focusing the content to the user's eye box. Typically, the angle of the light emitted by the electronic display and propagated to the eye box is dependent on the optical design of the display optics.

However, for a user gazing forward (e.g., on-axis), there may be a perceived drop in brightness toward the periphery of the user's field of view. Furthermore, as the user changes their gaze, the angle of the light will change as the eye's position within the eye box changes, such that the user is no longer viewing the image on-axis. In this case, the perceived brightness may change as the user gazes across a scene produced by the electronic display despite the electronic display generating a constant-brightness scene.

BRIEF DESCRIPTION OF THE DRAWINGS

Non-limiting and non-exhaustive aspects of the present disclosure are described with reference to the following figures, wherein like reference numerals refer to like parts throughout the various views unless otherwise specified.

FIG. 5A illustrates an angular distribution of a subpixel included in an electronic display.

FIG. 5B illustrates a reduced angular distribution of a subpixel by way of a light director, in accordance with aspects of the present disclosure.

FIG. 6A illustrates a primary emission angle of a subpixel included in an electronic display.

FIG. 6B illustrates an off-axis primary emission angle, in accordance with aspects of the present disclosure.

DETAILED DESCRIPTION

Various aspects and embodiments are disclosed in the following description and related drawings to show specific examples relating to a head mounted display (HMD). Alternate aspects and embodiments will be apparent to those skilled in the pertinent art upon reading this disclosure and may be constructed and practiced without departing from the scope or spirit of the disclosure. Additionally, well-known elements will not be described in detail or may be omitted so as to not obscure the relevant details of the aspects and embodiments disclosed herein.

As mentioned above, an HMD may include an electronic display (e.g., LCD, OLED, etc.) to generate content (e.g., light) for displaying to the user. However, many electronic displays are designed to include a wide viewing angle. For example, with devices such as a mobile device (e.g., tablets, smart phones, etc.), computer monitor, or television, it is typically desirable for the electronic display to be viewable from any angle and ideally, provide a 180-degree viewing angle.

However, in the context of HMDs, the viewing angle of the electronic display with respect to the user is fixed. This is because the optical assembly of the HMD is paired with the electronic display to focus the light emitted by the electronic display for a particular eye box area of the user. Thus, the wide viewing angles designed into the electronic display typically wastes a fair amount of light since much of the light emitted by the electronic display will never become incident on the eye of the user (e.g., outside of the eye box). Furthermore, some optical assemblies may include polarizers and/or partially reflective layers that reduce the amount of light ultimately passed to the user. Consequently, the electronic displays may be driven very hard to increase the brightness of the light emitted. However, driving certain types of electronic displays (e.g., OLED displays) with high current to achieve high brightness may degrade the electronic display (e.g., brightness degradation) as well as produce an unwanted color-shift over time.

Accordingly, aspects of the present disclosure include a light director assembly disposed over an electronic display of an HMD. The light director assembly may include several individual light directors that are configured to control the brightness of the light emitted by the electronic display. In one aspect, the light director assembly includes a light director for each subpixel of the electronic display, where each light director is configured to control the brightness by tuning an angular distribution of the light emitted by a corresponding subpixel. In addition, the light directors may be configured to tune a primary emission angle (e.g., direction) of the light generated by each of the subpixels to accommodate various optical assembly designs. These and other aspects will be described in more detail below.

Figure 1:
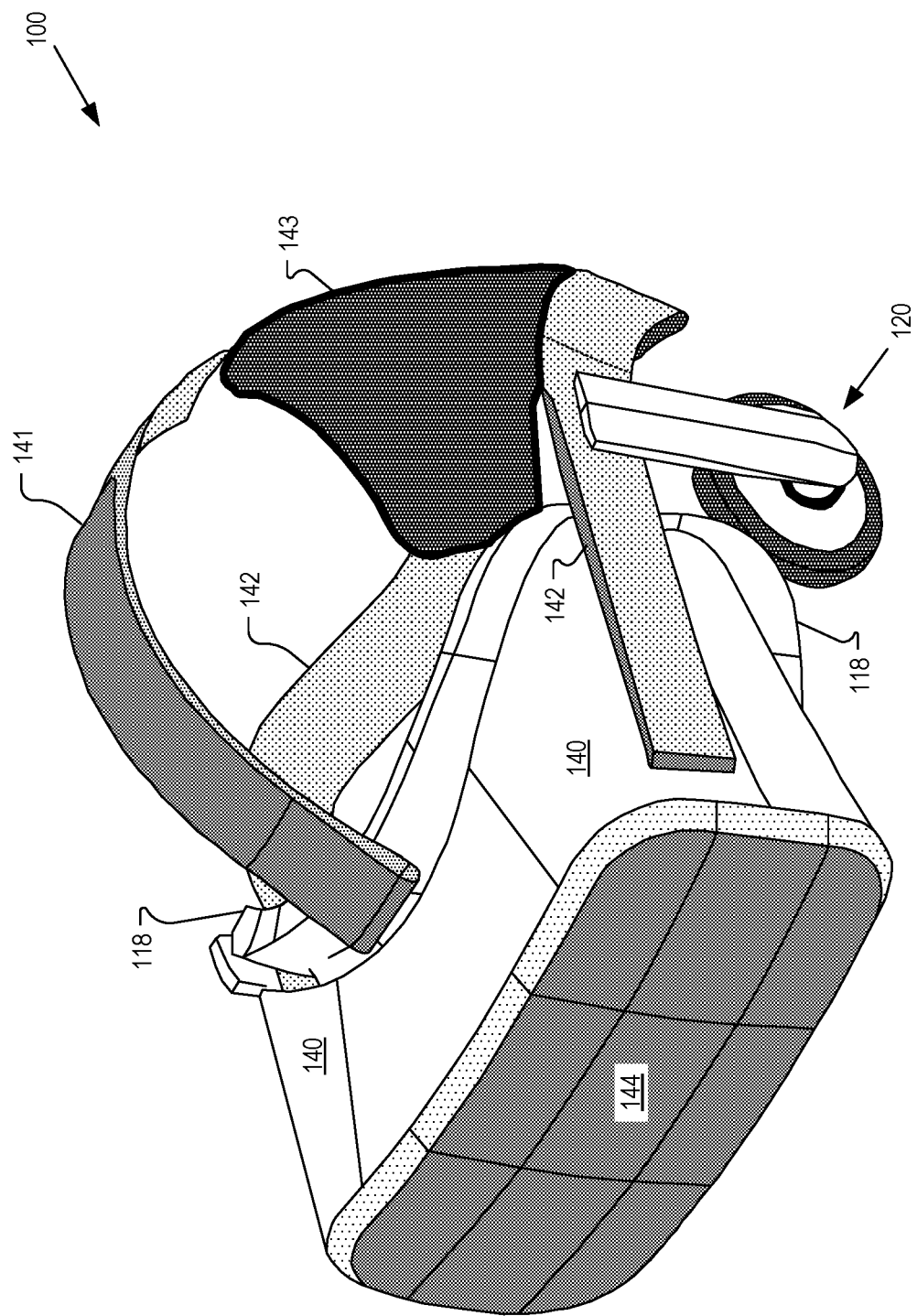
FIG. 1 illustrates a head mounted display (HMD), in accordance with aspects of the present disclosure.

FIG. 1 illustrates an HMD 100, in accordance with aspects of the present disclosure. The illustrated example of HMD 100 is shown as including a viewing structure 140, a top securing structure 141, a side securing structure 142, a rear securing structure 143, and a front rigid body 144. In some examples, the HMD 100 is configured to be worn on a head of a user of the HMD 100, where the top securing structure 141, side securing structure 142, and/or rear securing structure 143 may include a fabric strap including elastic as well as one or more rigid structures (e.g., plastic) for securing the HMD 100 to the head of the user. HMD 100 may also optionally include one or more earpieces 120 for delivering audio to the ear(s) of the user of the HMD 100.

The illustrated example of HMD 100 also includes an interface membrane 118 for contacting a face of the user of the HMD 100, where the interface membrane 118 functions to block out at least some ambient light from reaching to the eyes of the user of the HMD 100.

Example HMD 100 may also include a chassis for supporting hardware of the viewing structure 140 of HMD 100 (chassis and hardware not explicitly illustrated in FIG. 1). The hardware of viewing structure 140 may include any of processing logic, wired and/or wireless data interface for sending and receiving data, graphic processors, and one or more memories for storing data and computer-executable instructions. In one example, viewing structure 140 may be configured to receive wired power and/or may be configured to be powered by one or more batteries. In addition, viewing structure 140 may be configured to receive wired and/or wireless data including video data.

In some examples, an eye-tracking camera (not explicitly shown in FIG. 1) may be included in viewing structure 140 to capture image(s) of an eye of a user of HMD 100. Viewing structure 140 may also include a display system having one or more electronic displays for directing light to the eye(s) of a user of HMD 100. The display system may include one or more of an LCD, an organic light emitting diode (OLED) display, or micro-LED display for emitting light (e.g., content, images, video, etc.) to a user of HMD 100. As will be described below, the HMD 100 may include a light director assembly disposed over the electronic display included in the viewing structure 140 for tuning the brightness and/or directionality of the light emitted by the electronic display.

Figure 2:
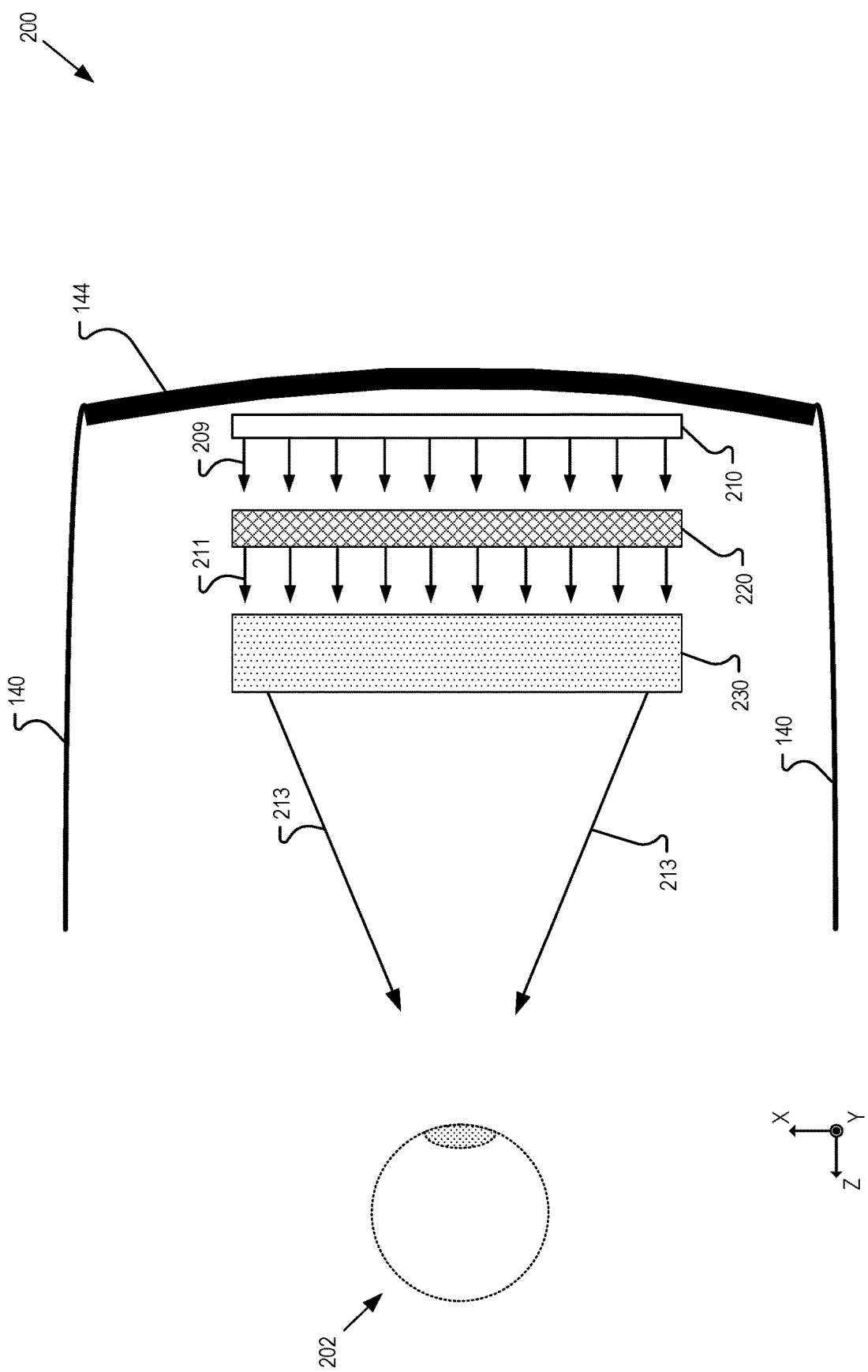
FIG. 2 is a functional block diagram illustrating various components of an HMD, in accordance with aspects of the present disclosure.

For example, FIG. 2 is a functional block diagram an HMD 200 that includes viewing structure 140, front rigid body 144, an electronic display 210, a light director assembly 220, and an optical assembly 230, in accordance with aspects of the present disclosure. HMD 200 is one possible implementation of HMD 100 of FIG. 1.

In the illustrated example of HMD 200, the light director assembly 220 is disposed between the electronic display 210 and the optical assembly 230. In operation, the light director assembly 220 receives light 209, emitted by subpixels included in the electronic display 210, and then directs the light 211 to the optical assembly 230, which then generates a focused and/or magnified light 213 to the eye 202 of the user.

In some examples, electronic display 210 is an organic light emitting diode (OLED), a liquid crystal display (LCD), or a micro-LED display, where each subpixel included in the electronic display 210 is designed to generate light 209 having a wide angular distribution. However, as mentioned above, electronic displays that generate light with a wide angular distribution may be inefficient in an HMD context due to much of the light falling outside of the eye box of eye 202. Accordingly, light director assembly 220 may include several light directors (e.g., one light director for each subpixel) to reduce the angular distribution of the light 209 emitted from a corresponding subpixel of the electronic display 210. The light directors may also be configured to adjust a primary emission angle (e.g. direction) of the light 209 emitted by one or more of the subpixels of electronic display 210.

In some examples, the light directors included in the light director assembly 220 may be configured to reduce the angular distribution and/or adjust the primary emission angle as a function of the spatial position of a corresponding subpixel of the electronic display 210. The angular distribution and the primary emission angle of each light director may be tuned to match a particular optical assembly 230. Using a light director to reduce the angular distribution of a subpixel may result in a peak intensity increase of between five and ten times when compared with a subpixel not paired with a light director.

Figure 3:
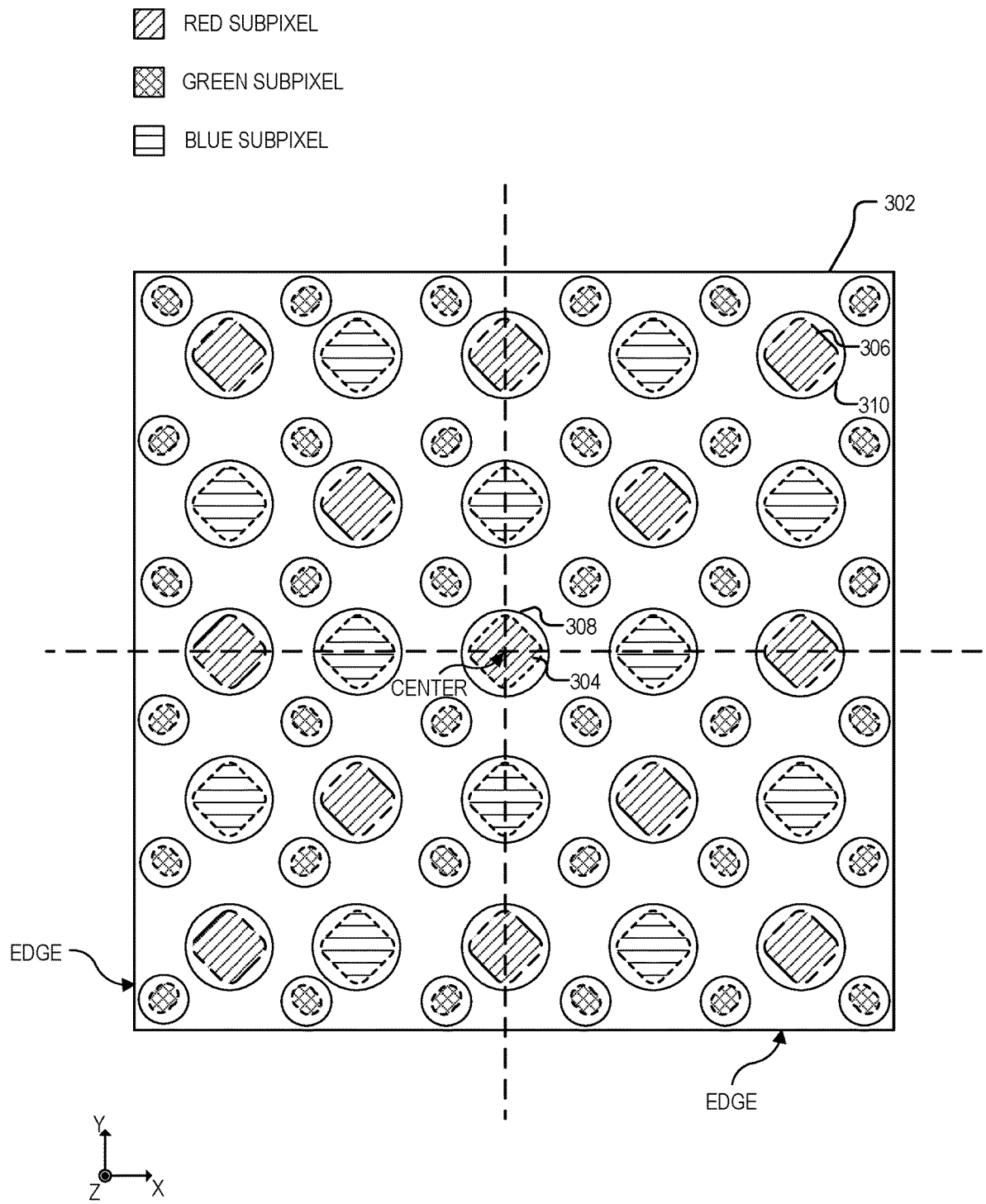
FIG. 3 illustrates subpixels of an electronic display and corresponding light directors, in accordance with aspects of the present disclosure.

FIG. 3 illustrates a region 302 of subpixels of an electronic display as well as a plurality of light directors (e.g., light directors 308 and 310), in accordance with aspects of the present disclosure. The region 302 of subpixels is one possible implementation of subpixels included in electronic display 210 of FIG. 2.

As shown in FIG. 3, the example region 302 of subpixels is shown as including subpixels of various colors (e.g., red, green, and blue) arranged in a sparse pattern. In some implementations, the subpixels included in the region 302 may be arranged in a PENTILE™ pattern, such as a diamond PENTILE™ pattern. However, in other implementations, the subpixels included in region 302 may be arranged in a variety of patterns, including RGB, RGBG, and RGBW patterns, and the like.

In some examples, the sparse pattern of the subpixels included in region 302 provides for a near Lambertian distribution of light emitted by the electronic display (e.g., electronic display 210 of FIG. 2). A near Lambertian distribution may provide a light output that has a wide angular distribution, but as mentioned above, may result in wasted light, as the light at wide viewing angles does not become incident on the eye of the user of the HMD. Accordingly, FIG. 3 illustrates several light directors (e.g., light director 308 and light director 310) disposed over a respective subpixel (e.g., subpixel 304 and subpixel 306) to control the angular distribution of the corresponding subpixel. In some examples, the light directors 308 and 310 may also control a primary emission angle (e.g. direction) of their respective subpixels 304, 306.

In one example, the light directors shown in FIG. 3, including light directors 308 and 310, are light directors included in the light director assembly 211 of FIG. 2. In addition, FIG. 3 illustrates a one-to-one ratio of light directors to subpixels, where each light director includes a corresponding subpixel. However, in other examples, each light director included in the light director assembly may correspond to a grouping of subpixels that includes more than one subpixel.

As mentioned above, each light director may be configured to reduce the angular distribution and/or adjust the primary emission angle as a function of the spatial position of a corresponding subpixel. Thus, in the illustrated example of FIG. 3, light director 308 may reduce the angular distribution of the corresponding subpixel 304 by a first amount, whereas light director 310 may reduce the angular distribution of the its corresponding subpixel 306 by a second amount. Similarly, light director 308 may adjust the primary emission angle of the subpixel 304 by an amount that is different than the amount that light director 310 adjusts the primary emission angle of subpixel 306.

In some examples, the light directors are configured to adjust the angular distribution and/or primary emission angle based on a distance of their corresponding subpixel from a center of the region 302. In some aspects, the amount that the light directors reduce the angular distribution of their corresponding subpixel progressively decreases as a distance between the subpixel and the center of the region 302 increases. In other words, in this example, the light directors towards the edge of the region 302 may produce a wider distribution angle as compared to light directors near the center of region 302. Furthermore, the amount that the light directors change the primary emission angle (e.g. direction) of the light generated by a respective subpixel may change, also based on the distance of the subpixel from the center of region 302. In some examples, the light directors are configured to increase the primary emission angle based on a design of the optical assembly (e.g., optical assembly 220 of FIG. 2). For example, the light directors may be configured to progressively increase the primary emission angle of their respective subpixels as the distance from the center increases, biased outwards towards the edges of region 302, if the optical assembly is larger (e.g., wider) than the region 302 of subpixels. In another example, the light directors may be configured to progressively increase the primary emission angle of their respective subpixels as the distance from the center increases, biased inwards towards the center of region 302, if the optical assembly is smaller (e.g., narrower) than the region 302 of subpixels. By way of example, light director 308 may reduce the angular distribution of the light emitted by subpixel 304 to a first distribution angle, while maintaining a primary emission angle that is substantially on-axis (e.g., orthogonal to a surface of the electronic display). Continuing with this example, light director 310 may reduce the angular distribution of the light emitted by subpixel 306 to a second distribution angle that is greater than the first distribution angle (e.g., light director 310 produces a wider distribution angle than that of light director 308). Light director 310 may also change the primary emission angle of subpixel 306 to an off-axis primary emission angle (e.g., greater than the primary emission angle of light director 308).

Figure 4:
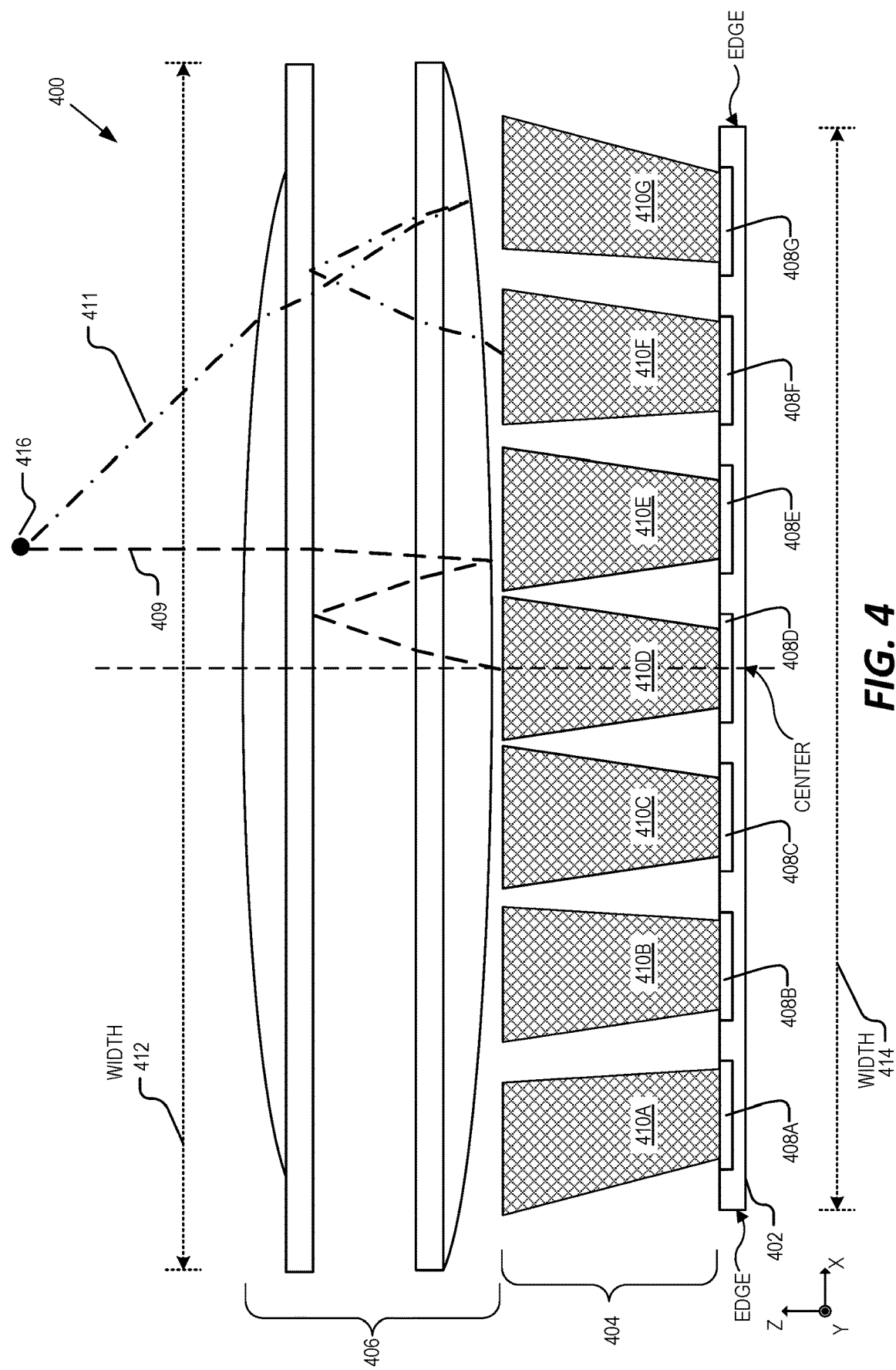
FIG. 4 illustrates a side-view of an electronic display, light director assembly, and optical assembly, in accordance with aspects of the present disclosure.

FIG. 4 illustrates a side-view of an HMD optical system 400 that includes an electronic display 402, a light director assembly 404, and an optical assembly 406, in accordance with aspects of the present disclosure. Electronic display 402 is shown as including subpixels 408A-G, while light director assembly 404 is shown as including light directors 410A-G. HMD optical system 400 may be included in HMD 100 of FIG. 1 and/or HMD 200 of FIG. 2. Similarly, electronic display 402 is one possible implementation of the region 302 of subpixels illustrated in FIG. 3.

As shown in FIG. 4, light director assembly 404 is disposed between the electronic display 402 and the optical assembly 406 and includes light directors 410A-410G. Although FIG. 4 only illustrates seven light directors of the light director assembly 404, light director assembly 404 may include hundreds, thousands, or millions of light directors, each corresponding to at least one subpixel of the electronic display 402.

Optical assembly 406 is shown as including several optical elements, partially reflective layers, and polarization sensitive optical layers. In other embodiments, optical assembly 406 may include fewer optical layers. Optical assembly 406 is configured to focus light (e.g., light 409 and 411) generated by the electronic display 402 (received via light director assembly 404) to the eye 416 of a user of the HMD optical system 400. As shown, optical assembly 406 includes a width 412 that is greater than the width 414 of electronic display 402. Accordingly, the light directors 410A-G may be configured to increase a primary emission angle (biased outwards towards the edges) of the light generated by the electronic display 402 to direct electronic display light to the surface of optical assembly 406. In addition, each of the light directors 410A-G may be configured to reduce the angular distribution of light generated by a corresponding subpixel 408A-G. For example, light director 410A may be configured to reduce the angular distribution of light generated by subpixel 408A, while light director 410B may be configured to reduce the angular distribution of light generated by subpixel 408B. In one example, the distribution angle produced by light director 410A is greater than the distribution angle produced by light director 410B.

FIG. 5A illustrates an angular distribution of a subpixel 502. Subpixel 502 is one possible subpixel included in an electronic display, such as electronic display 210 of FIG. 2. The angular distribution of subpixel 502 is shown in FIG. 5A as distribution angle $\theta_1$ 504. In one aspect, the distribution angle $\theta_1$ 504 represents light 506 that is emitted by subpixel 502 that has an intensity at or above an intensity threshold. In other words, light 506 emitted by subpixel 502 within distribution angle $\theta_1$ 504 has an intensity that is at or above the intensity threshold, whereas light emitted by subpixel 502 at angles greater than the distribution angle $\theta_1$ 504 has an intensity that is less than the intensity threshold.

In one aspect, the intensity threshold is a percentage (e.g., 50%, 70%, etc.) of a peak intensity of light emitted by the subpixel 502. In some examples, the distribution angle $\theta_1$ 504 may represent the Full Width at Half Maximum (FWHM) of light emitted by the subpixel 502 (e.g. the width of the light 506 emitted by subpixel 502 measured between light rays which are half of a peak intensity of subpixel 502). In other examples, the intensity threshold is a fixed value. That is, the intensity threshold may be a predetermined measure of the luminous intensity (e.g., candela (cd)), such that only light emitted by subpixel 502 that has an intensity equal to or greater than the intensity threshold determines the distribution angle $\theta_1$ 504.

As shown in FIG. 5A, the subpixel 502 includes a relatively wide distribution angle $\theta_1$ 504 and in some electronic displays, the distribution angle $\theta_1$ 504 may approach 160 or even 180 degrees. Having a wide distribution angle $\theta_1$ 504 is highly desirable for mobile device, televisions, and monitors, however, as discussed above, a subpixel that generates light with a wide distribution angle may be inefficient in an HMD context due to much of the light falling outside of the eye box of the user's eye.

Accordingly, FIG. 5B illustrates a reduced angular distribution of subpixel 502 by way of light director 510, in accordance with aspects of the present disclosure. Light director 510 is one possible example of any of the light directors included in light director assembly 210 of FIG. 2, light directors 308/310 of FIG. 3, and/or light directors 410A-G of FIG. 4. As shown in FIG. 5B, light director 510 is configured to reduce the angular distribution of the light 516 emitted by the subpixel 502. In some examples, each of the light directors, including light director 510, included in a light director assembly are configured to reduce the angular distribution to a distribution angle that is less than thirty (30) degrees. FIG. 5B illustrates the light director 510 reducing angular distribution of the subpixel 502 to a distribution angle $\theta_2$ 512, where distribution angle $\theta_2$ 512 is less than the distribution angle $\theta_1$ 504 of FIG. 5A. Reducing the angular distribution of a subpixel, by way of light director 510, concentrates light emitted by the subpixel resulting in increased brightness from the perspective of a user of an HMD.

FIG. 6A illustrates a light ray 602 emitted by subpixel 502 at a primary emission angle. In some examples, the primary emission angle is the angle of peak intensity of light emitted by a subpixel. In the illustrated example, the primary emission angle of light ray 602 is equal to zero degrees and is aligned with axis 619 that is orthogonal to a top surface of the subpixel 502.

As mentioned above, in addition to reducing the angular distribution, the light directors of the present disclosure may also be configured to adjust the primary emission angle of a respective subpixel. Accordingly, FIG. 6B illustrates a light director 606 configured to adjust the primary emission angle of subpixel 502 to an off-axis primary emission angle $\phi_2$ 604. Light ray 603 illustrates light from subpixel 502 being emitted at the primary emission angle $\phi_2$ 604 with respect to axis 619 which is orthogonal to a surface of subpixel 502. Light ray 603 emitted at the primary emission angle $\phi_2$ 604 may be the peak intensity of light 616. As mentioned above, the light director 606 may be configured to adjust the primary emission angle of subpixel 502 based on a spatial position of the subpixel within the electronic display. That is, light directors for subpixels positioned closer to the edge of the electronic display may produce a larger off-axis primary emission angle as compared to light directors for subpixels positioned near the center of the electronic display. In some examples, the direction of the primary emission angle is determined, in part, based on the design of the optical assembly included in the HMD. For example, for optical assemblies wider than the electronic display (e.g., FIG. 4), the primary emission angles produced by the light directors may be biased towards the edges of the electronic display, whereas for optical assemblies narrower than the electronic display, the primary emission angles may be biased towards the center of the electronic display.

Figure 7A:
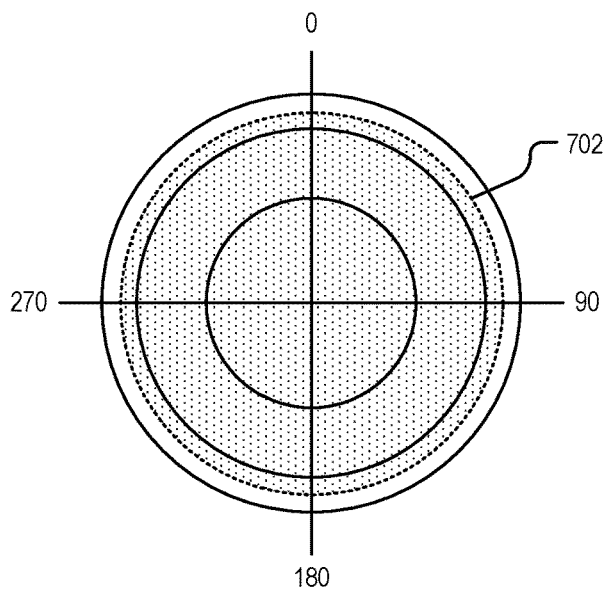
FIGS. 7A-7C are luminous intensity curves, in accordance with various aspects of the present disclosure.
Figure 7B:
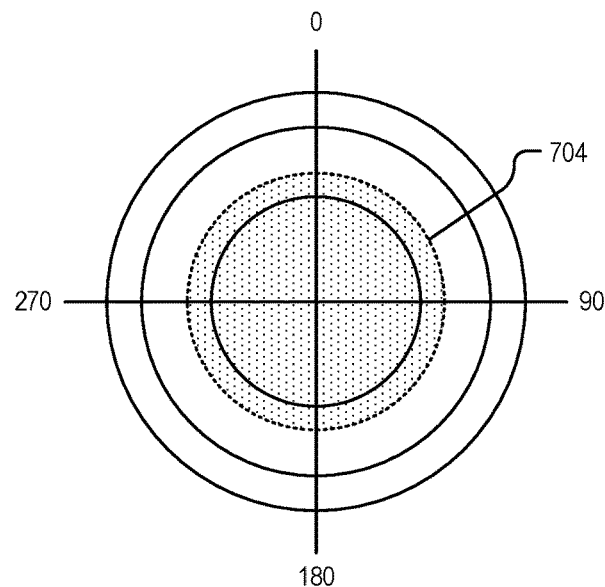
Figure 7C:
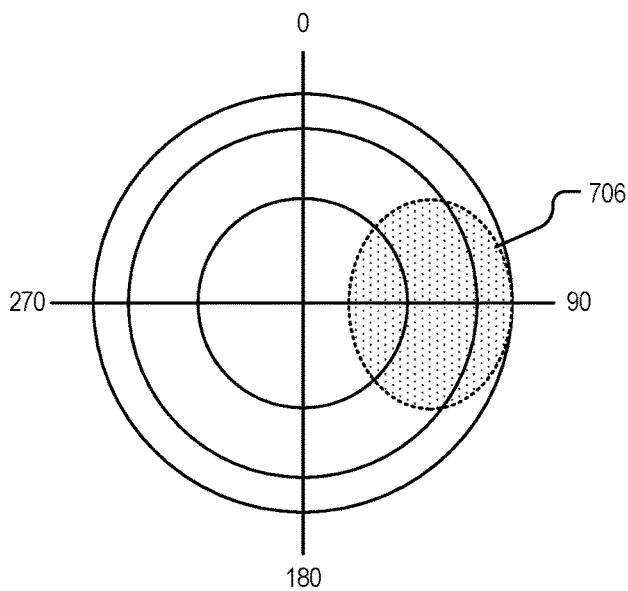
Figure 8A:
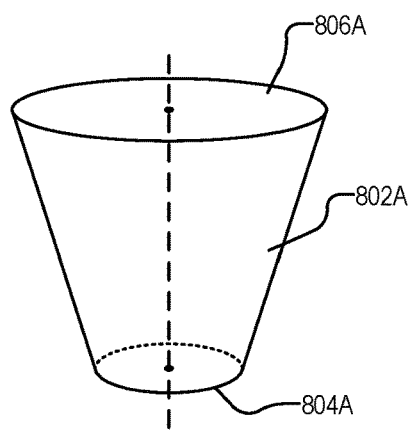
FIGS. 8A-8F illustrate various shapes and configurations of a light director, in accordance with various aspects of the present disclosure.
Figure 8B:
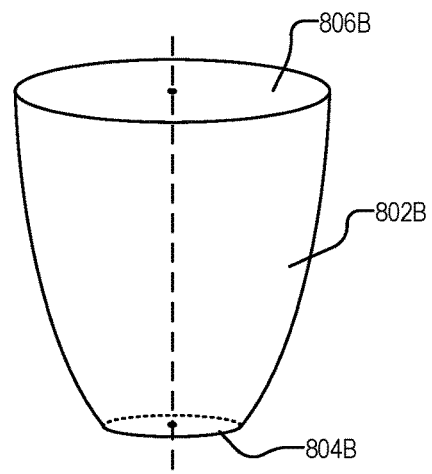
Figure 8C:
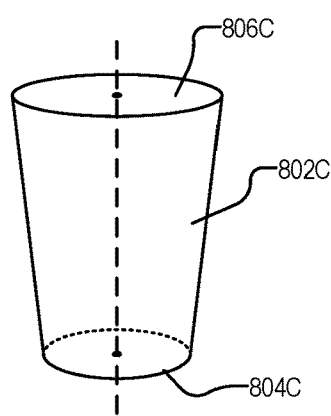
Figure 8D:
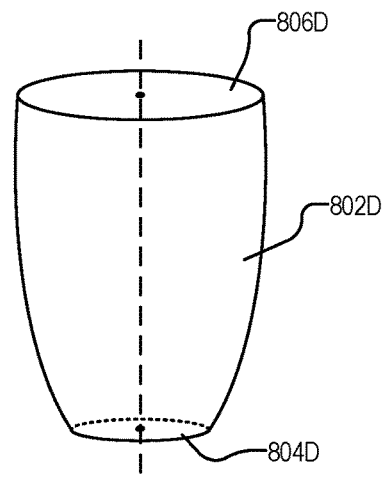
Figure 8E:
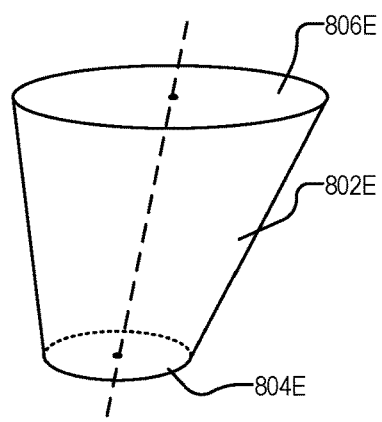
Figure 8F:
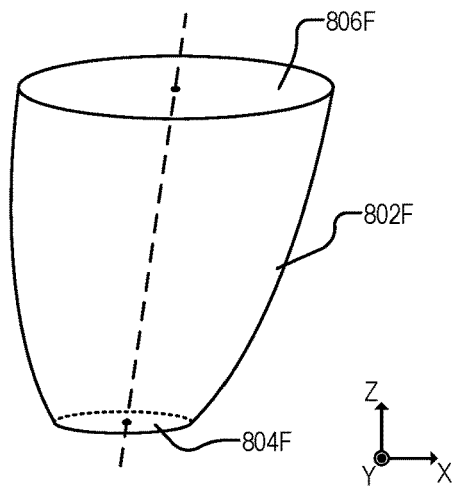

FIGS. 7A-7C are luminous intensity curves, in accordance with various aspects of the present disclosure. The illustrated example of FIG. 7A shows an angular distribution 702 of a subpixel without a corresponding light director, such as subpixel 502 of FIG. 5A. The illustrated example of FIG. 7B shows a reduced angular distribution 704 produced by a light director, such as the light director 510 of FIG. 5B. FIG. 7C illustrates a reduced angular distribution 706 that includes an adjusted off-axis primary emission angle, such as may be produced by the light director 606 of FIG. 6B.

FIGS. 8A-8F illustrate various shapes and configurations of light directors 802A-F, in accordance with various aspects of the present disclosure. Light directors 802A-F are possible implementations of any of the light directors included in light director assembly 210 of FIG. 2, light directors 308/310 of FIG. 3, and/or light directors 410A-G of FIG. 4. Light directors 802A, 802C, and 802E are shown as including a truncated conical shape, whereas light directors 802B, 802D, and 802F are shown as including a parabolic shape. Although FIGS. 8A-F illustrate light directors of truncated conical and parabolic shapes, the light directors may be configured in any three-dimensional regular or irregular shape (e.g., triangular pyramid, square pyramid, prism, etc.), depending in part on the desired angular distribution and/or primary emission angle.

Each of the illustrated light directors are shown as including a respective input port (e.g., input ports 804A-F) that are configured to be disposed on a corresponding subpixel for receiving light that is emitted from the corresponding subpixel. Similarly, each of the light directors are shown as including a respective output port (e.g., output ports 806A-F). As shown, each output port 806A-F is disposed opposite their corresponding input port 804A-F, where each output port 806A-F is configured to provide the light to the optical assembly of the HMD (e.g., optical assembly 230 of FIG. 2). In some aspects, each of the output ports 806A-F have a surface area larger than a surface area of their corresponding input port 804A-F. For example, output port 806A is shown as having a surface area larger than its corresponding input port 804A.

Furthermore, light directors 802A-D are shown as being configured to provide an on-axis primary emission angle (e.g., substantially orthogonal to the surface of their corresponding subpixel), whereas light directors 802E and 802F are shown as having a skewed shape to provide an off-axis primary emission angle.

Figure 9A:
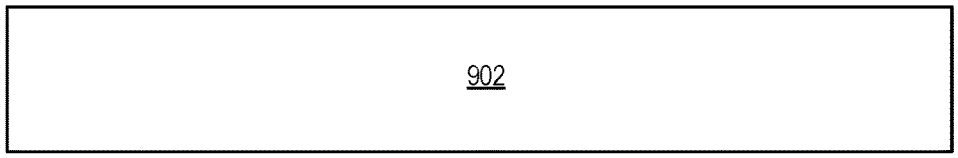
FIGS. 9A-9D are side-views of a light director assembly formed from an optically transmissive material, in accordance with aspects of the present disclosure.
Figure 9B:
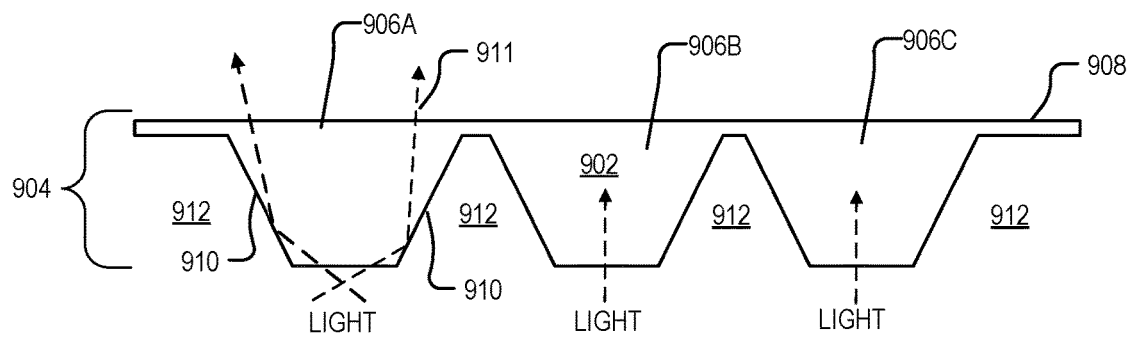

FIGS. 9A-9D are side-views of a light director assembly 904 formed from an optically transmissive material 902, in accordance with aspects of the present disclosure. For example, FIG. 9A illustrates a layer of optically transmissive material 902 from which the light director assembly 904 of FIG. 9B may be formed. In one example, the optically transmissive material 902 comprises a polymer. As shown in FIG. 9B, some of the optically transmissive material 902 may be removed from regions 912 to form the light director assembly 904 to include several light directors 906A-C. In some implementations, a thin layer 908 of optically transmissive material 902 may remain to provide structural support and/or to physically connect the light directors 906A-C to one another. In other examples, thin layer 908 may be omitted, where each light director 906A-C is placed on subpixels of the electronic display by a pick-and-place machine and bonded into place. In some examples, the gap between each light director 906 may be significantly larger than is illustrated in FIG. 9B.

In some aspects, the regions 912 may have a refractive index less than a refractive index of the optically transmissive material 902. For example, the optically transmissive material 902 may have a refractive index of 1.5 (e.g., for a polymer), whereas the regions 912 may have a refractive index of 1.0 (e.g., for air).

In some examples, the light directors 906A-906C rely on total internal reflection (TIR) along a boundary (e.g., exterior sidewalls 910) of the optically transmissive material 902 to reduce the angular distribution of the light 911 emitted from a corresponding subpixel as the light 911 propagates through the optically transmissive material 902.

Figure 9C:
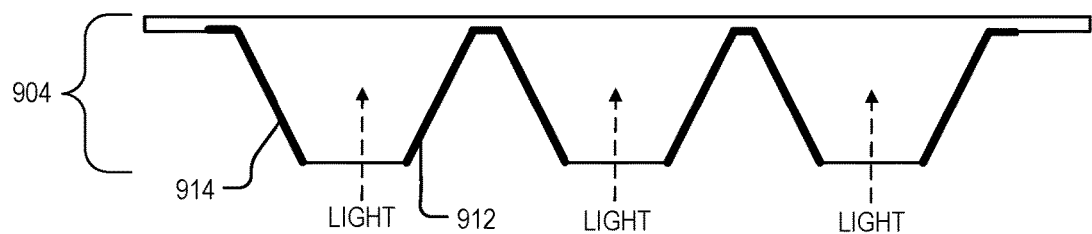

FIG. 9C illustrates an optional reflective material 914 that may be disposed on the exterior sidewalls 910 of the light directors 906A-C. In some examples, the reflective material 914 may comprise a metal.

Figure 9D:
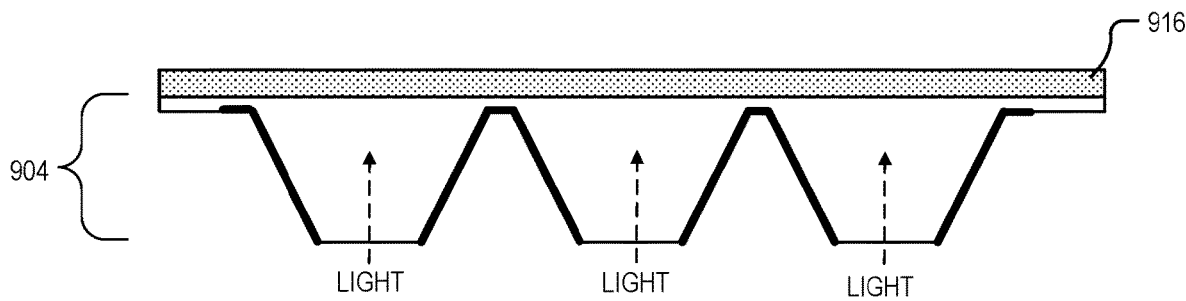

FIG. 9D illustrates a diffusing optical element 916 disposed over the light directors 906A-C. In some examples, the diffusing optical element 916 is disposed between the light director assembly 904 and the optical assembly of the HMD (e.g., optical assembly 230 of FIG. 2) to provide an image plane.

Figure 10A:
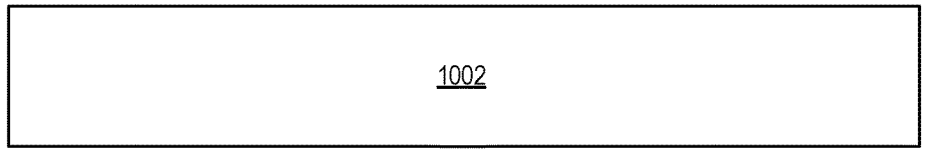
FIGS. 10A-10D are side-views of a light director assembly formed from a solid medium, in accordance with aspects of the present disclosure.
Figure 10B:
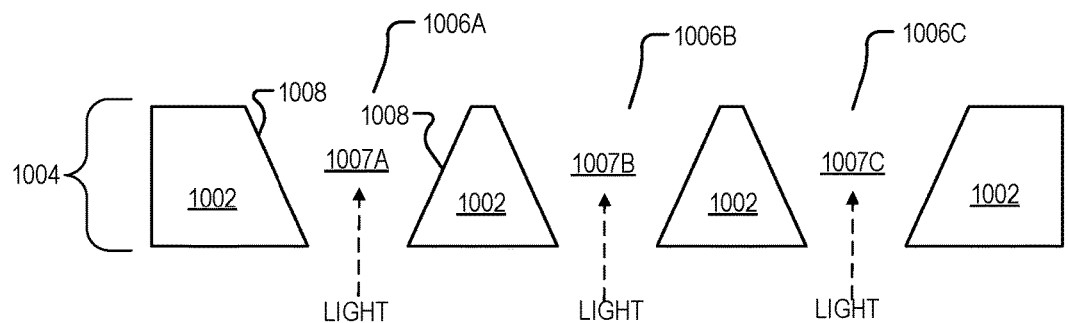

FIGS. 10A-10D are side-views of a light director assembly 1004 assembly formed from a solid medium 1002, in accordance with aspects of the present disclosure. For example, FIG. 10A illustrates a layer of a solid medium 1002 from which the light director assembly 1004 of FIG. 10B may be formed. The solid medium may be non-transparent. In one example, the solid medium 1002 comprises a polymer. As shown in FIG. 10B, some of the solid medium 1002 may be removed to form the light directors 1006A-C to include holes 1007A-C. In this example, light emitted from a corresponding subpixel propagates through the air included in holes 1007A-C.

Figure 10C:
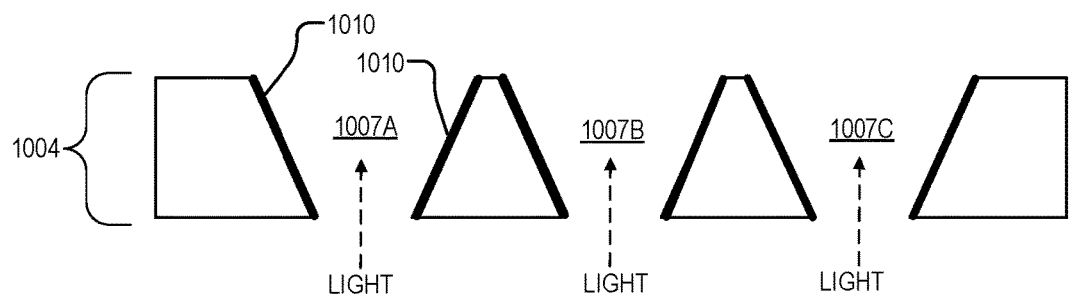

FIG. 10C illustrates an optional reflective material 1010 that may be disposed on interior sidewalls 1008 of the light directors 1006A-C. In some examples, the reflective material 1010 may comprise a metal.

Figure 10D:
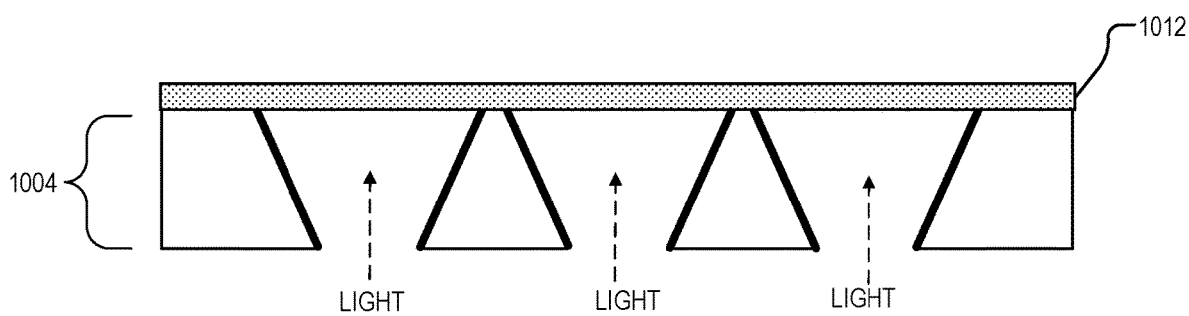

FIG. 10D illustrates a diffusing optical element 1012 disposed over the light directors 1006A-C. In some examples, the diffusing optical element 1012 is disposed between the light director assembly 1004 and the optical assembly of the HMD (e.g., optical assembly 230 of FIG. 2) to provide an image plane to the optical assembly.

In some embodiments of the disclosure, each light director (or groups of light directors) may be placed on subpixels of the electronic display by a pick-and-place machine and be bonded into place. In other embodiments, light director assembly 904 or 1004 may be made from a contiguous layer for ease of manufacturing. When the light director assembly is made from a contiguous layer, the light director assembly may be aligned with, and then bonded to, the electronic display so that the input port of each light director is properly aligned over its corresponding subpixel.

The functionality of one or more components described above with reference to FIGS. 1-10D may be implemented in various ways consistent with the teachings herein. In some designs, the functionality of these components may be implemented as one or more discrete optical components. In addition, the components and functions represented by FIGS. 1-10D, as well as other components and functions described herein, may be implemented using any suitable means. Such means also may be implemented, at least in part, using corresponding structure as taught herein. For example, a means for receiving the light and for directing the light to an optical assembly of the HMD may correspond at least in some aspects to, for example, the light director assembly 220 of FIG. 2, the light director assembly 404 of FIG. 4, the light director assembly 904 of FIGS. 9B-D, and/or the light director assembly 1004 of FIGS. 10B-D. In addition, a means for reducing an angular distribution of the light emitted from a respective subpixel may correspond to any of the light directors described and shown herein, including the light directors 308 and 310 of FIG. 3, the light director 510 of FIG. 5B, the light director 606 of FIG. 6B, the light directors 802A-F of FIGS. 8A-8F, the light directors 906A-C of FIG. 9B, and/or the light directors 1006A-C of FIG. 10B. Thus, in some aspects one or more of such means may be implemented using one or more optical components, layers, mediums, or other suitable structure as taught herein.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A head mounted display (HMD) comprising:
    an electronic display having a region of subpixels configured to emit light; and
    a light director assembly coupled to receive the light and to direct the light to an optical assembly of the HMD, wherein the light director assembly includes a plurality of light directors configured to reduce an angular distribution of the light emitted from corresponding subpixels included in the region of subpixels, wherein each light director in the plurality of light directors includes a sidewall having a truncated conical or a parabolic shape, wherein each of the plurality of light directors comprises an optically transmissive material and comprises a reflective material disposed on the sidewall of each of the plurality of light directors, wherein each of the plurality of light directors includes an output port that is flat, wherein at least some of the sidewalls of the plurality of light directors are skewed to progressively increase a primary emission angle of the corresponding subpixels as a distance of the corresponding subpixels increases from a center of the region of the subpixels.

2. The HMD of claim 1, wherein the light directors in the plurality are configured to reduce the angular distribution of the light to a distribution angle that is based on a spatial position of the corresponding subpixels in the region of subpixels.

3. The HMD of claim 1, wherein the optical assembly has an assembly width greater than a width of the light director assembly.

4. The HMD of claim 1, wherein the light directors rely on total internal reflection (TIR) along a boundary of the optically transmissive material to reduce the angular distribution of the light emitted from the corresponding subpixels propagating through the optically transmissive material.

5. The HMD of claim 1, wherein each of the light directors comprise:
    an input port disposed on the corresponding subpixel to receive the light emitted from the corresponding subpixel,
    wherein the output port is disposed opposite the input port to provide the light to the optical assembly, wherein the output port has a surface area larger than a surface area of the input port.

6. The HMD of claim 1, wherein the truncated conical shape includes a straight sidewall.

7. The HMD of claim 1, wherein the parabolic shape has a concave sidewall.

8. The HMD of claim 1, further comprising a diffusing optical element disposed between the light director assembly and the optical assembly to provide an image plane.

9. The HMD of claim 1, wherein the light directors are configured to reduce the angular distribution of the light to a distribution angle less than 30 degrees.

10. A head mounted display (HMD) comprising:
an organic light emitting diode (OLED) display having a region of subpixels configured to emit light;
an optical assembly configured to focus the light for an eye of a user of the HMD; and
a light director assembly coupled between the OLED display and the optical assembly to direct the light emitted from the OLED display to the optical assembly, wherein the light director assembly includes:
a plurality of light directors disposed to receive the light from corresponding subpixels of the region of subpixels, wherein each of the plurality of subpixels includes:
a sidewall having a truncated conical shape or a parabolic shape;
an optically transmissive material; and
a reflective material disposed on the sidewall; and
an output port that is flat,
wherein at least some of the sidewalls of the plurality of light directors are skewed to progressively increase a primary emission angle of the corresponding subpixels as a distance of the corresponding subpixels increases from a center of the region of the subpixels.

11. The HMD of claim 10, wherein:
at least some of the plurality of light directors are configured to reduce an angular distribution of the light based on a spatial position of each subpixel within the region of subpixels.

12. The HMD of claim 10, wherein the truncated conical shape is straight and the parabolic shape is concave.

13. The HMD of claim 1, wherein the reflective material comprises metal.

14. The HMD of claim 1, wherein the optically transmissive material comprises a layer for structurally supporting and physically connecting the light directors to one another.

15. The HMD of claim 10, wherein the reflective material comprises metal.

16. The HMD of claim 10, wherein the optically transmissive material comprises a layer for structurally supporting and physically connecting the first light director to the second light director.

* * * * *